United States Patent [19]

Menigat et al.

[11] Patent Number: 4,688,355
[45] Date of Patent: Aug. 25, 1987

[54] METHOD AND APPARATUS FOR CONTINUOUS COMPENSATION OF GRINDING WHEEL UNBALANCE

[75] Inventors: Roland Menigat, Liederbach; Klaus Gruppenbacher, Dieburg, both of Fed. Rep. of Germany

[73] Assignee: Hofmann Werkstatt-Technik GmbH, Pfungstadt, Fed. Rep. of Germany

[21] Appl. No.: 843,608

[22] Filed: Mar. 25, 1986

[30] Foreign Application Priority Data

Mar. 26, 1985 [DE] Fed. Rep. of Germany ....... 3510950

[51] Int. Cl.$^4$ .................. B24B 41/04; G01M 1/34
[52] U.S. Cl. ............................... 51/169; 51/281 R; 73/468; 74/573 F
[58] Field of Search .................. 73/468; 74/573 F; 51/169, 281 R

[56] References Cited

U.S. PATENT DOCUMENTS 3,950,897  4/1976  Birkenstack et al. ............ 51/169
4,432,253  2/1984  Kerlin ......................... 74/573 F

FOREIGN PATENT DOCUMENTS 2357629  5/1975  Fed. Rep. of Germany .

OTHER PUBLICATIONS

"Measuring Methods and Instruments of Hoffman Balancing Machines," by Gunter Junck, Hoffmann News No. 5.
"Principles of Balancing and Balancing Machines," by Gunther Himmler, Hofmann Info. No. 1.

Primary Examiner—Harold D. Whitehead
Attorney, Agent, or Firm—Fleit, Jacobson, Cohn & Price

[57] ABSTRACT

The invention pertains to a method of continuous compensation of unbalance present in a rotor, in particular, a grinding wheel. This is done by feeding a compensation fluid into correction chambers which are rotated with and arranged on the rotor at various angular locations. The supply of fluid is effected in successive balancing operations during rotation of the rotor and as a function of the minimum and maximum unbalance signals measured by a transducer over a certain period of time. The tolerance is determined for acceptable unbalance values. The balancing operation is terminated on the basis of the minimum and maximum which is multiplied by a multiplier determined as a function of allowable variations of the measured unbalance signal.

8 Claims, 2 Drawing Figures

METHOD AND APPARATUS FOR CONTINUOUS COMPENSATION OF GRINDING WHEEL UNBALANCE

DESCRIPTION OF PRIOR ART

A balancing device which can be controlled by the method of the present invention is shown in the German Application No. DE-OS 23 57 629 which corresponds to U.S. Pat. No. 3,950,897 (incorporated by reference herein). When grinding wheels or similar rotors are used to machine workpieces, wear on the peripheral surface of a rotor, in particular, a grinding wheel, makes it necessary to balance the rotor during rotation in order to obtain a high-quality surface finish. This requires two steps. First, continuous measurement of unbalances present in the rotor must be made. Second, quantities of compensation fluid must be supplied to the correction chambers rotating with and arranged on the rotor at various angular locations.

The unbalanced signal, supplied by a transducer, furthermore depends on the unforeseeable machine behavior, which varies constantly since the rotor mass is continually changing in any and all machining operations involving rotors such as grinding wheels. In addition, externally produced vibrations of other rotating rotors inside the machine (e.g., the grinding machine, and random vibrations resulting from the bearings) may cause variation of the measured unbalance signal. Variations of the signal are also due to short random vibrations which are produced when compensation fluid is injected into the correction chambers. These random vibrations may result in the termination of the balancing operation because the correction chambers are filled with compensation fluid and, therefore, any further balancing is not possible since the capacity of the chambers would be exceeded.

Furthermore, the measured unbalance signal can be adversely affected when the rotor passes the critical speed range, which can occur at any time with rotors and, in particular, with grinding wheels. As explained in German Patent Application No. P 35 03 724.5, which corresponds to copending U.S. Pat. No. 4,637,171, issued Jan. 20, 1987. (incorporated by reference herein), passing the critical speed range occurs because of the requirement to maintain a constant surface speed of the machining rotor, i.e., constant cutting speed. The number of revolutions per minute has to be constantly increased due to the wear on the peripheral surface of the rotor. In general, the speed range may be in excess of 750 to 2000 revs per minute. The resonance range is passed through when running from the subcritical into the overcritical range. Due to the mass of bearings, spindle and rotor (e.g., headstock and grinding wheel), the rotor unavoidably operates above and below resonance. When resonance is passed through, there is a phase shift from 0 to 180 degrees between the angular location of unbalance and the respective vibratory motion. The phase shift is likely to result in variations and/or interferences in the balancing operation. The present invention is directed toward eliminating this problem.

SUMMARY OF THE INVENTION

It is a primary object of the present invention to provide a method and compatible configuration of electric circuits, where any and all unwanted influences by interferences and/or variations of the measured unbalance signal on the balancing operation or operations are eliminated.

Due to the invention, overdrive in the balancing operations and simultaneous unbalance measurements are prevented, thus, steadying a closed-loop control circuit. Overdrive is prevented with the present invention because the tolerance limits, within which variations of unbalance are acceptable, are derived from the continuously measured unbalance signal. Tolerance limits have to be defined such that a satisfactory grinding quality is obtained without resulting in the system going into overdrive. The tolerance values are non-dimensional quantities derived from empiric data of the grinding wheel industry.

The inventive method is preferably applied to and thus improves the method described in the German Patent Application No. P 35 03 724.5 which corresponds to copending U.S. Pat. No. 4,637,171, issued Jan. 20, 1987. The inventive method is applied after measurement of initial unbalance and before the beginning of the balancing operation, i.e., before injection of the quantity of compensation fluid into the correction chamber as the test quantity.

A noise factor is obtained by phase-controlled rectification from comparison of unbalance inputs and outputs, i.e., the difference between minimum and maximum unbalanced signals. The noise factor is multiplied by a multiplier, which ensures that, depending on accuracy requirements, the relative tolerance allows for peak-to-peak values of the unbalance signals which are somewhat greater than the minimum and maximum determined over a given period of time. This means a positive tendency of balance quality is achieved depending on noise signals and/or interferences inherent in the machine. Maximum and minimum values of the measured unbalance signal can be determined in less than 5 seconds, in particular, in approximately 1 to 2 seconds. With phase-controlled rectification, the noise factor is determined on the basis of several measurements.

Depending on the accuracy of the balancing operation to be performed, the multiplier that is multiplied by the difference betweenthe determined maximum and minimum is a value greater than 1 and, preferably, between 1 and 2.

DESCRIPTION OF THE PREFERRED EMBODIMENT

Figure 1:
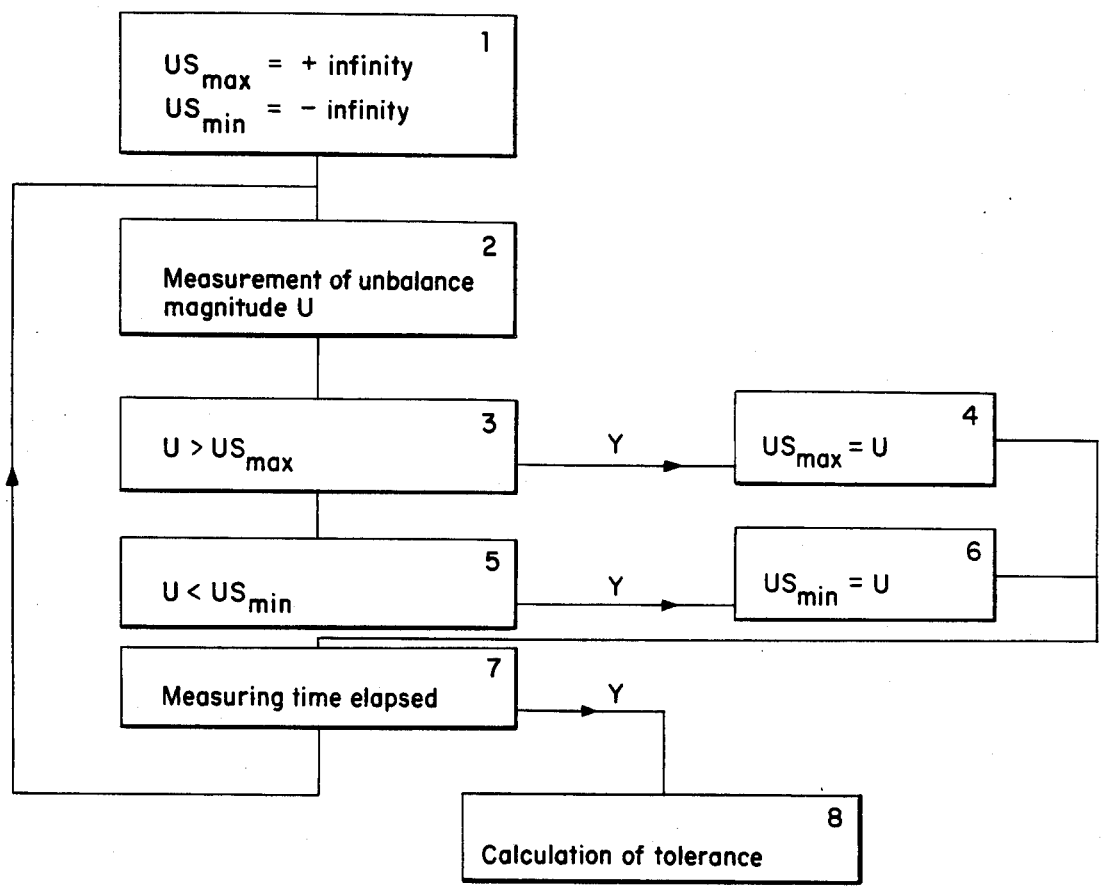
FIG. 1 is a flowchart of a preferred embodiment of the inventive method in which
  U is the magnitude of unbalance of the rotor to be balanced;
  $US_{max}$ is the maximum of the measured unbalance signal; and
  $US_{min}$ is the minimum of the measured unbalance signal.

The inventive method is put into practice in the preferred embodiment as follows:

1. As measurement begins, $US_{max}$ and $US_{min}$ memories are cleared and overwritten with maximum and minimum unbalance values.

2. The instantaneous unbalance magnitude U is measured.

3. The measured unbalance magnitude is compared with the stored maximum $US_{max}$.

4. If the measured unbalance magnitude is greater than the stored maximum $US_{max}$, $US_{max}$ will be overwritten with the unbalance magnitude just measured.

5. If the unbalance magnitude U is less than $US_{max}$, it will be compared with minimum $US_{min}$.

6. If the measured unbalance magnitude is less than the stored minimum $US_{min}$, $US_{min}$ will be overwritten with the measured unbalance magnitude.

7. If the measuring time for detection of minimum and maximum has not yet elapsed, the above procedure as per steps 2 to 6 will be repeated.

8. If measuring time has elapsed, tolerance T will be determined on the basis of $US_{max}$ and $US_{min}$ maximum and minimum now available following the formula $$T = (US_{max} - US_{min}) \times TM$$

where TM is the multiplier.

Multiplier TM is an empiric value in the grinding wheel industry. It is approximately 3, but is the lesser of the grinding accuracy and the grinding pattern. The method is concluded when the tolerance is calculated.

When the measured unbalance signal supplied by the transducer is analyzed according to phase-controlled rectification, the noise factor is determined by comparison of signal input and output of the phase-controlled rectifier. The transducer is of known type and can be purchased from any manufacturer. It may be of force-measuring, displacement-measuring or acceleration-measuring type. The transducer may be installed in any position on the grinding machine. In order to obtain good results, it should be installed near the grinding wheel's bearings on the machine. In phase-controlled rectification (see German Patent Application No. 11 08 475, Hofmann Info. No. 2 of Gebr. Hofmann GmbH & Co. KG, 6102 Pfungstadt, West Germany and Hofmann News No. 5 of Gebr. Hofmann GmbH & Co. KG, 6102 Pfungstadt, West Germany, all of which are incorporated by reference herein), the transducer output relative to vibrations caused by unbalance is rectified relative to a once-per-revolution square-wave phase reference voltage and then integrated via a RC element. For this purpose, two rectifiers operating 90 degrees out of phase are used. They supply two DC voltages indicative of amount and location of the unbalance signal. In phase-controlled rectification, all random vibrations and even-numbered harmonics are filtered out. The odd-numbered harmonics are suppressed by a broadband filter interposed between the transducer and the circuit for phase-controlled rectification. The broadband filter is, for example, a so-called tracking filter as part of the auto-tracking measurement technique as described by Gunter Junck in Hofmann News No. 5 of Gebr. Hofmann GmbH & Co. KG, 6102 Pfungstadt, West Germany, incorporated by reference herein. The broadband filter tracks the speed of the rotor to be balanced over the entire speed range. Thus, any noise or interfering signals contained in the measured signal are suppressed.

Figure 2:
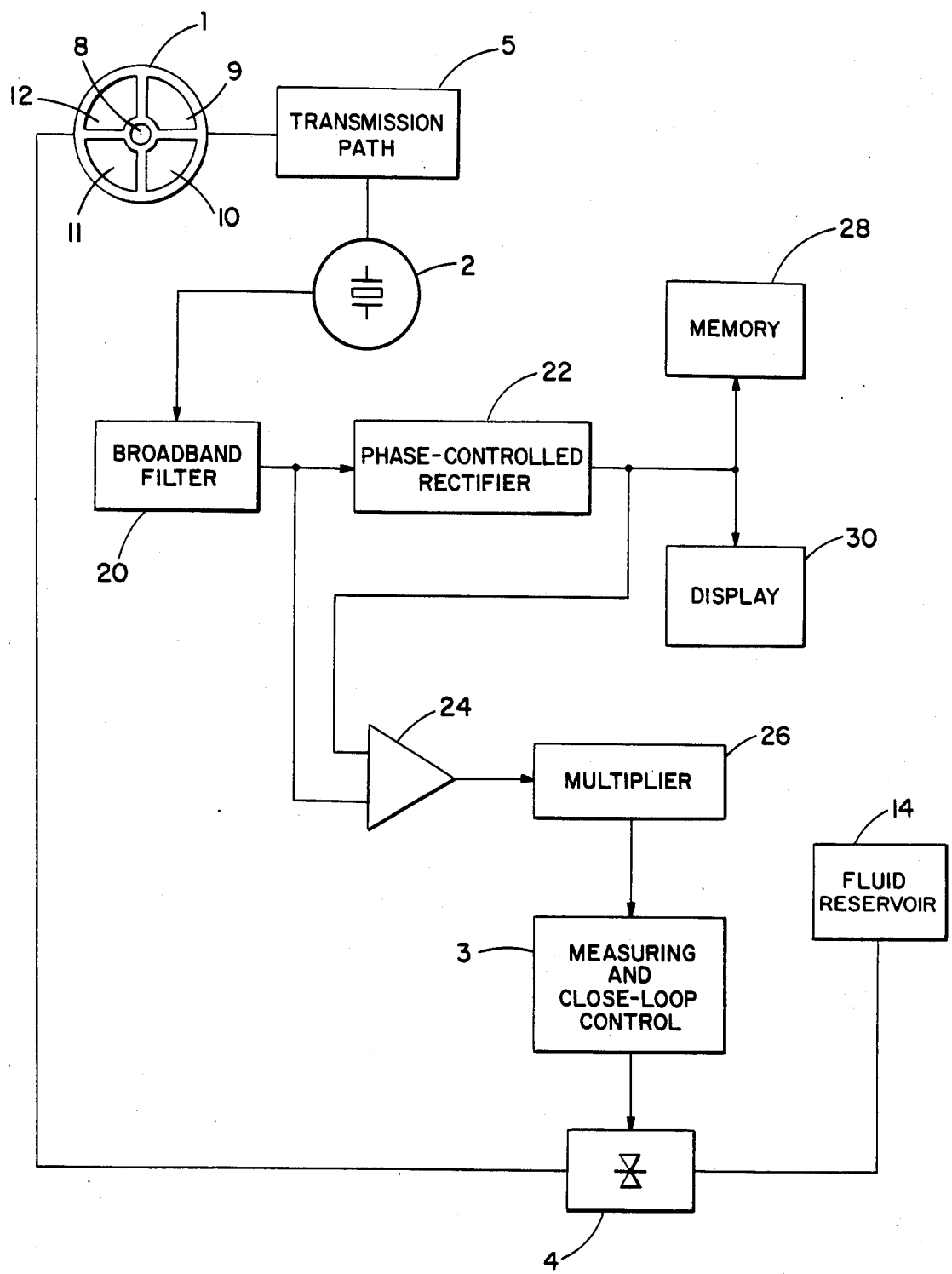
FIG. 2 is a block diagram of the preferred embodiment.

FIG. 2 schematically shows the grinding wheel 1 of a grinding machine (not represented) of a device for practicing a preferred embodiment of the inventive method. The grinding wheel 1 may be designed similar to the one in the previously mentioned U.S. Pat. No. 3,950,897 which discloses a balancing apparatus, particularly for a grinding wheel 1, whereby the wheel has four chambers 9–12 disposed around it axis of rotation by spindle 8 with each chamber connected to one face of a ring shaped container by a slot formed in a circular recess at a different radius so that the wheel can be balanced by injecting cooling fluid or the like from a fluid reservoir 14 into the slots by valve 4 to temporarily add fluid to selected chambers.

The unbalance of the grinding wheel 1 is continuously compensated for in successive balancing operations during the grinding process. The vibrations produced by the unbalance of the grinding wheel 1 are detected as respective measured signals. The signals are detected through a transmission path 5 by a transducer 2 (in particular an acceleration transducer) and are forwarded to a electronic measuring and closed-loop control system . Transmission path 5 as per FIG. 2 is illustrated schematically only, e.g., for the whole grinding machine. The transmission path between rotor 1 and transducer 2 includes the amplification factor inherent in the machine as well as phase angle and phase error of the vibrations caused by unbalance. As such data is now known, precise balancing is not possible. Both the measuring and closed-loop control system 3 and the transmission path are described in greater detail in previously mentioned copending U.S. patent application Ser. No. 825,146.

Valve device 4 is a common valve which is preferably driven by an electrical means as shown and described in German Application No. DE-OS 23 57 629 corresponding to U.S. Pat. No. 3,950,897 (incorporated by reference herein).

A detailed treatment of the principles of balancing is presented in the publication by Gunther Himmler, entitled "Hofmann Info. No. 1, Principles of Balancing and Balancing Machines" (incorporated by reference herein), printed in the Federal Republic of Germany by Gebr. Hofmann GmbH & Co. KG, 6102 Pfungstadt/West Germany.

As can be seen in FIG. 2, the transducer 2 supplies the measured unbalance signal, which still contains noise signals. The signal is fed into the broadband filter 20. The output of the broadband filter 20 is connected to the input of the circuit 22 for phase-controlled rectification. One suitable phase-control rectifier is described in German Patent Application No. DE AS 11 08 475, incorporated by reference herein. The output of filter 20 is also connected to comparator 24. In addition, the output of phase-control circuit 22 is also connected to another input of comparator 24. Furthermore, the output signal of phase-control circuit 22 is forwarded to a memory 28 and/or display device 30 to store or display the amount and angular location of unbalance. The broadband tracking filter 20 operates over the whole speed range of the rotor to be balanced. When the filter is combined with the phase-controlled rectifier 22, the transducer output, which is indicative of the measured unbalance, is not only analyzed but inherent noise signals are suppressed. The difference between input and output of the phase-controlled rectifier circuit 22, which is determined in comparator 24, is a measure of the noise contribution (noise component) and is multiplied as noise factor N by multiplier TM. Multiplier TM is an empiric value and is determined as a function of allowable variations of the measured unbalance signal. Multiplication is accomplished in the multiplier 26 which is connected to the output of comparator 24 in order to determine tolerance T according to the equation $$T = N \times TM.$$

In the preferred embodiment illustrated in FIG. 2, the input of comparator 24 is connected to the input of phase-controlled rectifier 22. This comparator input may also be connected to the input of the broadband filter 20, preferably a tracking filter, for determination of the noise factor N.

In the preferred method shown in FIG. 1, noise contribution $N_n = (US_{max} - US_{min})$ is determined and compared with the previously determined noise contribution $N_{n-1}$. If there is any difference between both noise contributions $N_n$ and $N_{n-1}$, noise contribution $N_n$ will be multiplied by multiplier TM to reassess tolerance T.

In the preferred embodiment shown in FIG. 2, noise contribution $N_n$ is determined by comparison of measured unbalance signals available anywhere between the transducer 2 and the phase-controlled rectifier 22, in particular, at the input of the phase-controlled rectifier circuit 22 and at the output of the rectifier 22. If there is any difference between noise contribution $N_n$ and the previously determined noise contribution $N_{n-1}$, noise contribution $N_n$ will be multiplied by the multiplier TM in order to reassess tolerance. These two procedures are applied simultaneously or, alternatively, so that tolerance T is reassessed either by the one or the other.

Theoretically, it would be possible to obtain rather small tolerance limits with these two procedures, which may result in overdrive of the system. In order to avoid this unwanted phenomenon, another procedure is preferably applied at the same time to provide a minimum liit of tolerance adjustment. This theory is based on consideration of a small tolerance T which will automatically result in a larger extent of variations of phase position; this means that minimum tolerance can be defined by maximum allowable extent of variations of the phase position.

The smaller the amount of unbalance, the larger the influence by noise contribution and consequently variations in the phase position of the residual unbalance result. The phase position of the residual unbalance can vary between 0° and 360° when unbalance is zero. In order to avoid such variations of phase position, or to reduce them, minimum unbalance tolerance is defined such that unambiguous position readings of the residual unbalance are still guaranteed. These minimum values are empiric data which depend onthe vibration-mass system of the grinding wheel to be balanced on the grinding machine.

In order to minimize tolerance adjustment, the phase of the unbalance signal is measured and the extent of variations of phase position is determined. When the extent of variations exceeds a given value, in particular, 0.5 to 10 deg. (e.g., due to considerable noise or interferences), the respective noise contribution N is determined for the currently measured unbalance signal and multiplied by the multiplier TM in order to reassess tolerance.

It is recommended that the procedure for determinating appropriate tolerance limits be done prior to the start of the balancing operations to prevent overdrive during the actual balancing process. If the variations of measured unbalance signals are within tolerance, balancing operations will no longer be initiated or the balancing operation just performed will be terminated.

From the foregoing description of the preferred embodiments of the invention, it will be apparent that many modifications may be made therein. It should be understood that these embodiments are intended as examples of the invention only and that the invention is not limited thereto.

What is claimed is:

1. A method of continuous compensation of unbalance present in a rotor, wherein a compensation fluid is fed into correction chambers rotating with and arranged on said rotor at various angular locations, said fluid being supplied by successive balancing operations during rotation of said rotor as a function of measured unbalance signals produced by a transducer, the method comprising the steps of:

determining a noise contribution component in said measured unbalance signals supplied by said transducer;

determining a noise factor based upon said noise contribution component;

determining a multiplier as a function of allowable variances of said measured unbalance signal;

determining a tolerance by multiplying said noise factor by said multiplier; and terminating said balancing operation when said measured unbalance signals are within a tolerance limit.

2. The method as set forth in claim 1, including determining minimum and maximum values of said measured unbalance signals which contain said noise contribution component over a given period of time; and forming said noise factor based upon the difference between said minimum and maximum values.

3. The method as set forth in claim 2, including determining said maximum and minimum values of said measured unbalance signal in less than 5 seconds.

4. The method as set forth in claim 1, including analyzing said measured unbalance signal supplied by said transducer which still contains said noise contribution component by phase-controlled rectification with simultaneous suppression of noise; and determining said noise factor by comparing the values of said measured unbalance signal before and after said phase-controlled rectification.

5. The method as set forth in claim 4, including determining the extent of variations of the phase position of said measured unbalance signal; and multiplying said noise factor then available by said multiplier in order to reassess tolerance if a given extent of variations defining minimum tolerance has been exceeded.

6. The method as set forth in claim 5, including selecting phase positions between 0.5 and 10 deg. for the given extent of variations.

7. The method as set forth in claim 5, by using said multiplier greater than 1.

8. A device for continuous compensation of unbalance in a rotor by a balancing device, wherein a compensation fluid is fed into correction chambers rotating with and arranged on said rotor at various angular locations, said fluid being supplied by successive balancing operations during rotation of said rotor as a function of measured unbalance signals produced by a transducer, said device comprising:

means for determining a noise contribution component in said measured unbalanced signal from said transducer;

memory means;

means for phase-controlled rectifying said measured unbalance signal with simultaneous suppression of noise, the phase-controlled rectification means being interposed between said transducer and said memory component;

comparator means for comparing the input and output values of said phase-controlled rectification means to obtain a noise factor;

multiplier means for determining a multiplier as a function of allowable variations of said measured unbalance signal, said multiplier means multiplying said noise factor from said comparator means, and said multiplier means controlling said balancing device; and, means to terminate said balancing operation when said measured unbalance signals are within a tolerance limit.

* * * * *